(12) United States Patent
Bennett

(10) Patent No.: US 8,151,301 B2
(45) Date of Patent: Apr. 3, 2012

(54) IP TV QUEUING TIME/CHANNEL CHANGE OPERATION

(75) Inventor: James D. Bennett, Hroznetin (CS)

(73) Assignee: Broadcom Corporation, Irvine, CA (US)

( * ) Notice: Subject to any disclaimer, the term of this patent is extended or adjusted under 35 U.S.C. 154(b) by 635 days.

(21) Appl. No.: 12/324,819

(22) Filed: Nov. 26, 2008

(65) Prior Publication Data
US 2010/0037267 A1    Feb. 11, 2010

Related U.S. Application Data

(60) Provisional application No. 61/086,711, filed on Aug. 6, 2008.

(51) Int. Cl.
  G06F 3/00    (2006.01)
  G06F 13/00   (2006.01)
  H04N 5/445   (2011.01)
(52) U.S. Cl. .............. 725/41; 725/94; 725/95; 725/146; 725/59
(58) Field of Classification Search ................... None
See application file for complete search history.

(56) References Cited

U.S. PATENT DOCUMENTS

| | | | | |
|---|---|---|---|---|
| 5,623,613 A | * | 4/1997 | Rowe et al. | 715/841 |
| 6,005,565 A | | 12/1999 | Legall et al. | |
| 6,064,376 A | * | 5/2000 | Berezowski et al. | 725/42 |
| 2006/0075428 A1 | * | 4/2006 | Farmer et al. | 725/38 |
| 2006/0080703 A1 | * | 4/2006 | Compton | 725/34 |
| 2006/0259926 A1 | * | 11/2006 | Scheelke et al. | 725/48 |
| 2007/0174880 A1 | * | 7/2007 | Fite et al. | 725/87 |
| 2008/0168496 A1 | * | 7/2008 | Lee et al. | 725/39 |
| 2008/0168512 A1 | * | 7/2008 | Nguyen | 725/105 |
| 2008/0270890 A1 | * | 10/2008 | Stern | 715/239 |
| 2008/0288991 A1 | * | 11/2008 | Smoyer et al. | 725/95 |
| 2009/0125945 A1 | * | 5/2009 | Lee et al. | 725/46 |

* cited by examiner

*Primary Examiner* — Dominic D Saltarelli
*Assistant Examiner* — Jason J Chung
(74) *Attorney, Agent, or Firm* — Garlick & Markison

(57) ABSTRACT

An Internet based television program delivery server, communicatively coupled to a plurality of television source devices and a plurality of recipient devices, that receives a plurality of Internet protocol television programs, buffers them, converts recipient device selected Internet protocol television programs to preview Internet television programs (having reduced per video frame data size) and transmits the preview Internet protocol television programs to the recipient device, for a short duration, until full scale Internet protocol television programs become available for viewing on the recipient device. A video conversion circuitry built into the Internet based television program delivery server performs the conversion of some of these television video contents to preview television video contents, to compensate for delay in full scale television program delivery during. The conversion itself includes reductions in frame rate, color and pixel resolutions, screen size and aspect ratios such that it produces lower bandwidth Internet protocol television program packets, during channel changing.

11 Claims, 9 Drawing Sheets

IP TV QUEUING TIME/CHANNEL CHANGE OPERATION

CROSS REFERENCES TO RELATED APPLICATIONS

The present application claims priority under 35 U.S.C. 119(e) to U.S. Provisional Application Ser. No. 61/086,711, filed Aug. 6, 2008, and having a common title with the present application, which is incorporated herein by reference in its entirety for all purposes.

BACKGROUND

1. Technical Field

The present invention relates generally to multimedia content; and, more particularly, to Internet based video sourcing/streaming.

2. Related Art

Research and development in recent years have led many Internet based commercial operators to seize the opportunities and deliver multitudes of server based services that were unthinkable only few years ago. These services include delivery of streaming audio and video to a plurality of computers world wide. Thus, a user may be able to access audio or video content of one's own region anywhere in the world. These services are typically charged on monthly or pay per view basis and the user has to login and authenticate before being able to utilize these services.

One specific type of service that relates to delivery of audio and video content is delivery of a plurality of television and radio programs from across the world to the user's computers. The servers typically redirect the users to a corresponding television or radio source server and the user is able to access the television broadcast from these source servers. The above mentioned television programs are typically called Internet protocol Tele-Vision (IPTV), because these television programs are transported (either live or stored program files from servers) to the user's computer by using Internet protocol technology; that is, by compressing, time stamping and packetizing programs, using Internet protocol.

Delays also occur in IPTV programming during periods of changing of channels, for various reasons. During channel change operations a controlling server redirects a user's computer to a differing content server. The user computer must reestablish an audio video session with the new content server, which often has different content settings/specifications (frame rate, color and resolutions etc.). Without changing the settings, only one channel at a time can be watched. In addition, each of the channels all over the world has their own handshake video setup operations. Thus, IPTV channel surfing becomes problematic because the setup of a new video stream image has significant delay, resulting in a blank/black screen during the channel change operation. These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
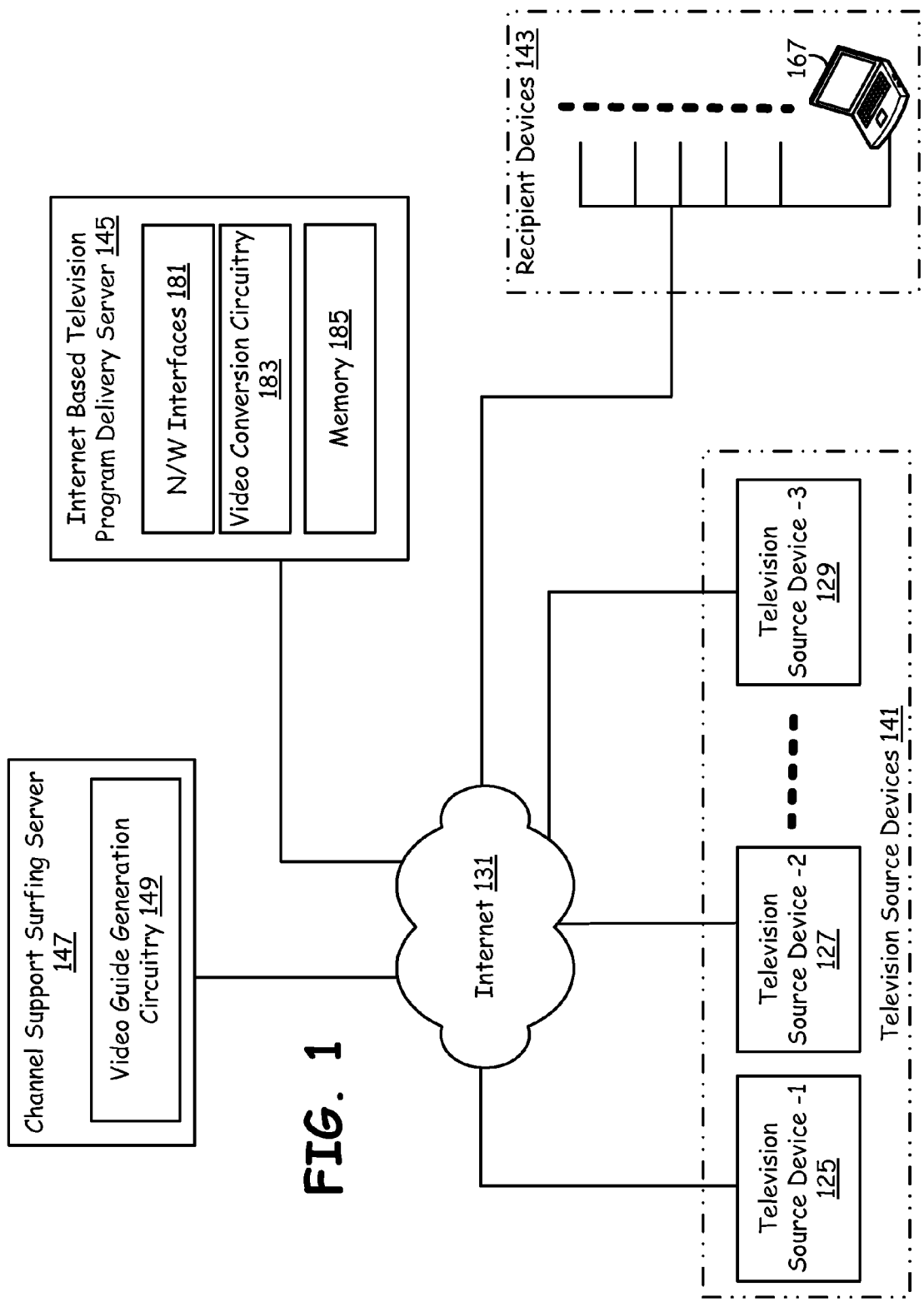
FIG. 1 is a schematic block diagram illustrating an Internet based television program delivery server, communicatively coupled to a plurality of television source devices and plurality of recipient devices via Internet, wherein the Internet based television program delivery server receives and buffers a plurality of Internet protocol television programs, converts selected Internet protocol television programs to preview Internet television programs (having reduced per video frame data size) and transmits it until the full scale Internet protocol television programs become available according to one or more embodiments of the present invention.

FIG. 1 is a schematic block diagram illustrating an Internet based television program delivery server 145, communicatively coupled to a plurality of television source devices 125, 127, 129 and plurality of recipient devices 143 via Internet 131, wherein the Internet based television program delivery server 145 receives and buffers a plurality of Internet protocol television programs, converts selected Internet protocol television programs to preview Internet television programs (having reduced per video frame data size) and transmits it until the full scale Internet protocol television programs become available according to one or more embodiments of the present invention. In specific, the Internet based television program delivery server 145 receives request from a recipient device for Internet protocol television program services and performs some or all of the following tasks: (a) Register and authenticate a recipient device 167; (b) Install some Internet based television program delivery server's 145 components in the recipient device that provide a Internet protocol television program user interface containing a scrollable and selectable channel list, JPEG preview still image and preview Internet protocol television program viewing facilities, and channel search facilities; (c) Receive a plurality of Internet protocol television programs from television source devices 125, 127, 129, and buffer them; (d) Convert the selected Internet protocol television programs to preview Internet protocol television programs (having reduced per video frame data size as compared to the Internet protocol television programs); (e) Transmit the preview Internet protocol television programs that correspond to the selected Internet protocol television programs to the recipient device 167, for a short duration, until the full scale Internet protocol television programs become available for viewing on the recipient device 167; and (f) Handing over the recipient device 167 to the respective television sources 125, 127, 129, once full scale Internet protocol television programs become available.

A memory 185 contained in the Internet based television program delivery server 145 buffers the plurality of Internet protocol television programs, to be able to perform conversions at appropriate time (that is, during channel changing or channel preview request from a recipient device 167, during scrolling). Network interfaces 181 support communication between many source television devices 141, recipient devices 143, and the Internet based television program delivery server 145.

Video conversion circuitry 183 contained in the Internet based television program delivery server 145 performs video conversion of the Internet protocol television programs to lower bandwidth preview Internet protocol television programs. The video conversion itself includes many processes to reduce per video frame data size as compared to the Internet protocol television programs, to compensate for any delay in full scale television program delivery during, channel changing. That is, the Internet based television program delivery server 145 converts the selected or requested Internet protocol television programs to preview Internet television programs, having reduced per video frame data size as compared to the Internet protocol television programs only for a short duration and transmits them to the recipient device 167, until full scale Internet protocol television programs become available for viewing on the recipient device 167. In addition, the video conversion circuitry 183 adapts the television video content of differing protocol standards to a format corresponding to the recipient device 167.

The video conversion circuitry 183 itself contains a plurality of preview video frame adaptation modules (not shown in this illustration, refer to the FIG. 3) that adapt a plurality of television program's frame rates to compensate for delay in full scale television program delivery. When a channel is changed or channel preview is requested by the recipient device 167, for example, the preview video frame adaptation modules adapt frame rate of a television program requested by the recipient device 167 to compensate for the delay in television program delivery, and produce a lower bandwidth preview Internet protocol television programs.

In addition to adaptation of frame rate during channel change or channel preview request, the video conversion circuitry 183 contains a plurality of additional modules (not shown in FIG. 1, refer to the FIG. 3) that perform certain functionalities to reduce the bandwidth requirements that include reducing pixel resolution, color resolution, screen size and aspect ratio as compared to the corresponding Internet protocol television programs. To be able to perform frame rate adaptation and reduce pixel resolution, color resolution, screen size and aspect ratio, the Internet based television program delivery server 145 contains queuing modules that temporarily store Internet protocol television program packets arriving from each of the plurality of television source devices 125, 127, 129 in various buffer storage units 185.

The lower bandwidth preview Internet protocol television program packets are then delivered to the recipient device 167 during initial periods of channel changing at the recipient device 167, until full scale Internet protocol television program becomes available. The network interfaces 181 may also transmit the corresponding Internet protocol television program packets to the recipient device, along with the preview Internet protocol television program packets, in response to a channel selection request received from the recipient device 167.

Once full scale Internet protocol television program packets become available, the Internet based television program delivery server 145 performs the functionalities of coordinating handover of the recipient device 167 from receipt of the preview Internet protocol television program to receipt of corresponding Internet protocol television program and in turn, the plurality of television source devices 125, 127, 129 produce Internet protocol television program packets having respective protocol standards.

To authenticate, the Internet based television program delivery server 145 contains authentication modules (not shown here, refer to the FIG. 2) and memory 185. The authentication modules provide a user interface at the recipient device 167 that allow users of the recipient device 167 to login to the Internet based television program delivery server 145 and avail its services. These services include providing a scrollable and selectable channel list, JPEG preview still image and preview Internet protocol television program viewing facilities, and channel search facilities. To provide these services, the Internet based television program delivery server 145 contains video guide generation circuitry 149 (contained either in a separate channel support surfing server 147 or in the Internet based television program delivery server 145) that generates a video guide based upon Internet protocol television programs from the plurality of television source devices 125, 127, 129. The video guide may include video content representative of Internet protocol television program corresponding to at least some of the plurality of television source devices and respective program information for the Internet protocol television program.

For the first time when the recipient device 167 is registered, the Internet based television program delivery server 145 stores a few Internet based television program delivery server 145 based components on the recipient device 167, which allow user to avail the facilities of scrollable and selectable channel list, JPEG preview still image and preview Internet protocol television program viewing, and channel search. These components include a channel surfing engine that displays a scrollable and selectable list for channel selection, JPEG preview still image viewing (for example, a still image with all information related to a corresponding Internet protocol television program channel upon 'mouse over') and preview Internet protocol television program viewing (for example, a moving video upon 'mouse click'), and channel search. In addition, these components include a channel guide engine that requests a lower bandwidth preview Internet protocol television program for the selected channel of appropriate screen size, aspect ratio, pixel resolution, color resolution, and frame rate, until a full scale television image is available, during channel changing. These components may also be installed and supported by a separate channel support surfing server 147.

For example, a laptop computer 167 user may decide to avail services of the Internet based television program delivery server 145; as a first step, the user registers into the Internet based television program delivery server 145 by providing all necessary information. Then, the user may decide to go in for either pay per view option, monthly rental option or any of the other payment options. Then, the Internet based television program delivery server 145 installs the channel surfing engine and channel guide engine, via Internet 131 onto laptop computer 167, which are software modules that assist the user to select a channel among many available channels, preview JPEG preview still image with all information related to a corresponding Internet protocol television program channel, preview Internet protocol television program and channel search. Once installed, these components may automatically assist in authenticating the recipient device 167 and then, the channel guide engine downloads a video guide from the video guide generation circuitry 149 from the channel support surfing server 147 (alternatively, directly from the Internet based television program delivery server 145).

The channel surfing engine then is operable to display a scrollable and selectable channel list using an Internet protocol television program user interface. The Internet protocol television program user interface contains a search facility to search for any channel, a scrollable and selectable channel list with an icon that, upon 'mouse over' displays a JPEG preview still image corresponding to the Internet protocol television program. The JPEG preview still image provides all information related to the corresponding Internet protocol television program and thus assist the user to decide whether to watch that program or not. In addition, the same icon, upon 'mouse click' may provide a preview of the Internet protocol television program, with reduced bandwidth requirements and smaller screen size, aspect ratio, pixel and color resolutions.

If the user decides to watch this Internet protocol television program, then, the user may click on the adjacent link that corresponds to the Internet protocol television program (with a title of the Internet protocol television program channel) and the channel surfing engine acknowledges this decision of the user by displaying some text (such as, 'Please wait while we bring you the full scale IPTV Channel . . . ') and then continues to display the reduced bandwidth preview Internet protocol television program, until full scale Internet protocol television program becomes available. Once it becomes available, the channel surfing engine hands over the recipient device 167 to the respective television source 125, 127 or 129. Thus, the user benefits from the availability of a television user interface that is analogues to that of a conventional television interfaces (having a remote control that can scroll through channels, for example) and may scroll, search, get information and preview the channels before deciding to access watch a IPTV program.

Figure 2:
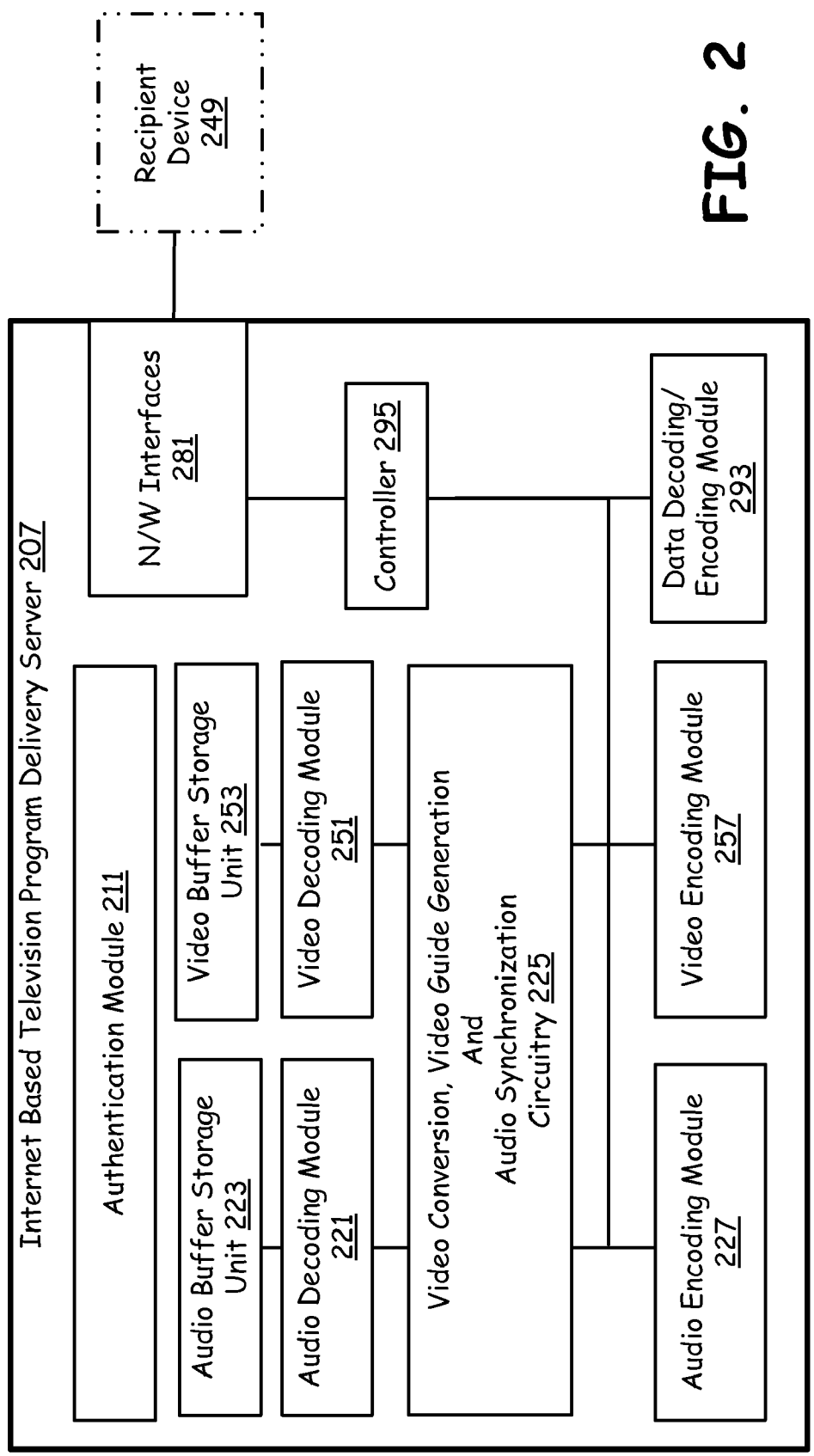
FIG. 2 is a schematic block diagram illustrating components of the Internet based television program delivery server of FIG. 1 of the present invention, wherein a video conversion and audio synchronization circuitry converts selected Internet protocol television programs to preview Internet television programs according to one or more embodiments of the present invention.

FIG. 2 is a schematic block diagram illustrating components of the Internet based television program delivery server 207 of FIG. 1 of the present invention, wherein a video conversion and audio synchronization circuitry converts selected Internet protocol television programs to preview Internet television programs. The Internet based television program delivery server 207 eliminates inconvenience to users of recipient devices 249 during channel changing and redirection to respective television source devices, by providing preview Internet protocol television programs. These preview Internet protocol television programs allow the user to watch television programs in a smaller popup window with reduced per video frame data size as compared to the Internet protocol television programs, until full scale Internet protocol television programs become available. Once they become available, the Internet based television program delivery server 207 coordinates handover of the recipient device 249 from receipt of the preview Internet protocol television program to receipt of corresponding Internet protocol television program and in turn, the corresponding television source device produces Internet protocol television program packets having respective protocol standards.

In addition, the Internet based television program delivery server 207 provides additional services such as providing a searchable, scrollable and selectable channel list and program list, and during such scrolling and selecting, the Internet based television program delivery server 207 provides facilities of JPEG preview still image containing all information about the channel and preview Internet protocol television programs to assist in selecting a channel or a program. All of these services are provided to the users on pay per view or monthly rental basis and the users should login to the Internet based television program delivery server 207 to avail these services.

To perform all these functionalities, the Internet based television program delivery server 207 contains a plurality of modules including authentication module 211, audio decoding module 221, audio buffer storage unit 223, video decoding module 251, video buffer storage unit 253, video conversion, video guide generation and audio synchronization circuitry 225, audio encoding module 227, video encoding module 257, a processor or controller 295, data decoding/encoding module 293 and network interfaces 281. There may be many such modules as 211, 221, 223, 251, 253, 225, 227, 257 and 293 to perform above mentioned functionalities upon Internet protocol television programs from a plurality of television sources, and to authenticate and deliver to a plurality of recipient devices such 249.

When the user of the recipient device 249 logs in, the authentication server 211 verifies user credentials such as username, email ID and password and then allows the video conversion, video guide generation and audio synchronization circuitry 225 to proceed with generation of a video guide that represents the video programs of a plurality of television source devices (in accordance with the scheme chosen by the user, such as, basic, regional, language based or enhanced television channel delivery schemes) along with JPEG still video images of each delivered channel name and delivers them, page by page, to the recipient device 249. The user at the recipient device 249 may, for example, 'mouse over' on an icon adjacent to a channel name in the scrollable and selectable channel list, upon which the user interfaces at the recipient device 249 display a JPEG preview still image containing all the information about the selected channel.

If, after scrolling through many channels, the user decides to click on the icon adjacent to a channel name in the scrollable and selectable channel list, the Internet based television program delivery components at the recipient device 249 open up a small popup window. Then, the components at the recipient device 249 request for delivery of preview Internet protocol television programs with reduced per video frame data size (until full scale Internet protocol television programs become available or the user decides to continue to scroll through the channel lists), that meet specifications of the small popup window.

Then, the audio decoding module 221 and video decoding module 251 at the Internet based television program delivery server 207 de-packetize and decompress the selected Internet protocol television program packets, that are arriving from a corresponding television source device and are stored in the audio buffer storage unit 223 and video buffer storage unit 253. Once the television programs are available in a standard format, the video conversion, video guide generation and audio synchronization circuitry 225 reduces its frame rate, color and pixel resolutions, aspect ratio and screen size to reduce per video frame data size, to the specifications provided by the Internet based television program delivery components at the recipient device 249. In addition, the video conversion, video guide generation and audio synchronization circuitry 225 synchronizes the audio signals to compensate for dropped frames.

Then, these reduced per video frame data size television programs are re-encoded (that is, again compressed and packetized) by the audio encoding module 227 and video encoding module 257 and delivered to the recipient device 249 until full scale Internet protocol television program becomes available or the Internet based television program delivery server 207 components at the recipient device 249 requests to stop delivery if these preview Internet protocol television programs.

Figure 3:
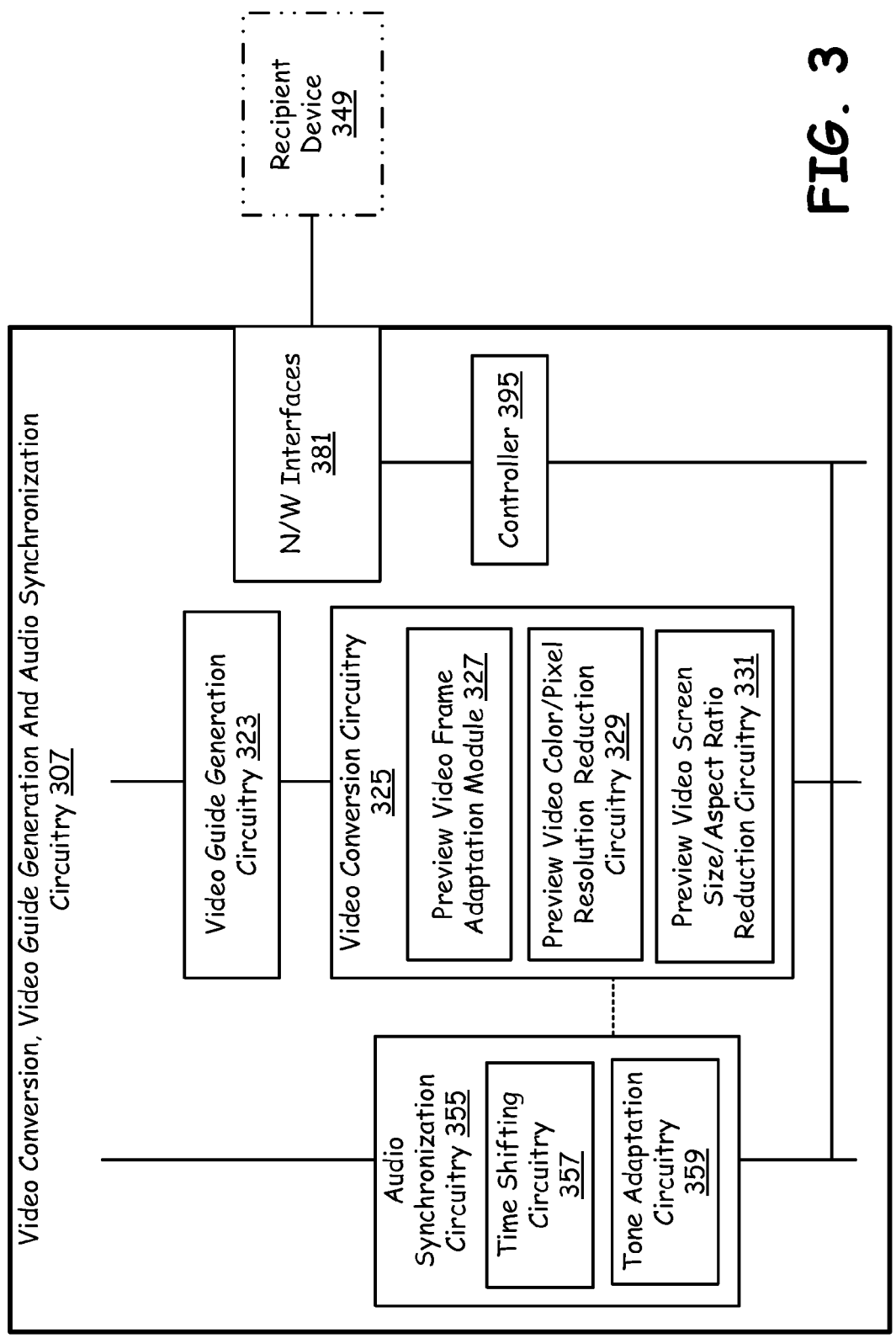
FIG. 3 is a schematic block diagram illustrating components of the video conversion and audio synchronization circuitry of FIG. 2 of the present invention.

FIG. 3 is a schematic block diagram illustrating components of the video conversion and audio synchronization circuitry 307 of FIG. 2 according to one or more embodiments of the present invention. The video conversion, video guide generation and audio synchronization circuitry 307 contain a plurality of modules that assist in generating custom video guide, along with JPEG still preview images containing information about the channel, and preview Internet protocol television programs with reduced per video frame data size as compared to the Internet protocol television programs. These modules include video guide generation circuitry 323, video conversion circuitry 325 and audio synchronization circuitry 355. The illustration also depicts some other components of the Internet based television program delivery server (207 of the FIG. 2) such as network interfaces 381 and controller 395, along with a recipient device 349 communicatively coupled to the Internet based television program delivery server.

Once authentication of the recipient device 349 is completed, depending upon the chosen scheme, the video guide generation circuitry 323 generates a custom built video guide along with JPEG preview still images containing all information about respective channels and delivers them to the recipient device 349 for display on the screen. Then, upon request from the recipient device 349 for preview Internet protocol television program of a selected channel, the video conversion circuitry 325 and audio synchronization circuitry 355 perform tasks that in effect reduce per video frame data size.

The video conversion circuitry 325 contains a plurality of modules such as preview video frame adaptation module 327, preview video color and pixel resolution reduction circuitry 329 and preview video screen size and aspect ratio reduction circuitry 331. The preview video frame adaptation module 327, preview video color and pixel resolution reduction circuitry 329 and preview video screen size and aspect ratio reduction circuitry 331 reduce frame rate (by dropping some frames, for example), pixel and color resolutions and aspect ratio and screen size (popup window size, for example) of the video program, according to specifications received from the recipient device 349. The reduction in frame rate often causes loss of audio synchronization and produces unwanted audio effects at the recipient device 349 during preview. The audio synchronization circuitry 355 contains a plurality of modules such as time shifting circuitry 357 and tone adaptation circuitry 359 to eliminate these unwanted effects. The time shifting circuitry 357 eliminates the audio signals that correspond to dropped video frames and the tone adaptation circuitry 359 gradually shifts entire frequency spectrum first upwards and then downwards at the transition point where frames are dropped.

Figure 4:
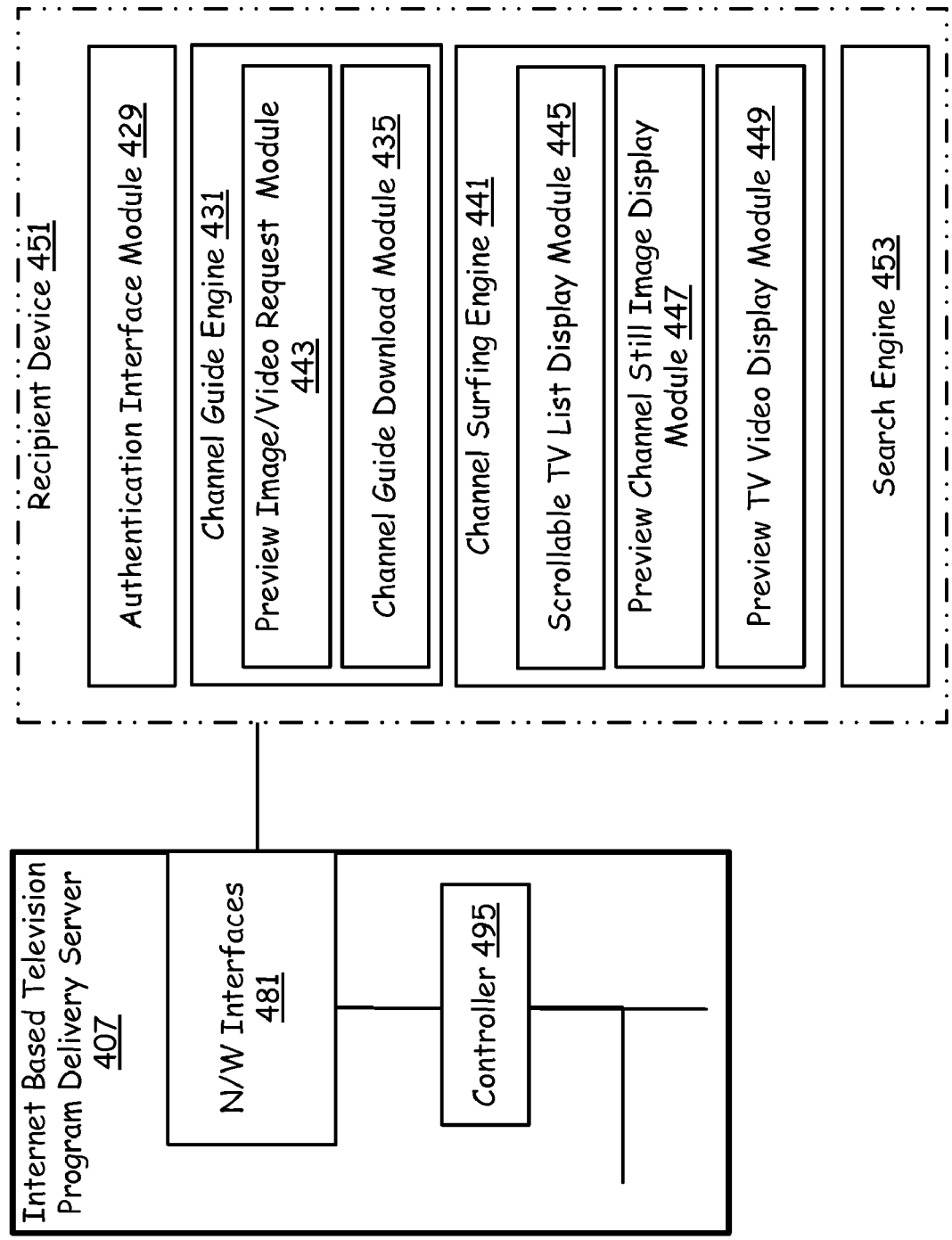
FIG. 4 is a schematic block diagram illustrating components of the recipient devices of FIG. 1 of the present invention, wherein the recipient devices incorporate Internet based television program delivery server components at the recipient device that allow user to avail the facilities of searchable, scrollable and selectable channel list, JPEG preview still image and preview Internet protocol television program viewing facilities according to one or more embodiments of the present invention.

FIG. 4 is a schematic block diagram illustrating components of the recipient devices of FIG. 1 of the present invention, wherein the recipient devices incorporate Internet based television program delivery server components at the recipient device that allow user to avail the facilities of searchable, scrollable and selectable channel list, JPEG preview still image and preview Internet protocol television program viewing facilities. The Internet based television program delivery components at the recipient device 451 may include authentication interface module 429, channel guide engine 431, channel surfing module 441 and search engine 453. These components may utilize a web browser at the recipient device 451 to provide user interfaces for performing the above mentioned functionalities. Components of the Internet based television program delivery server 407 shown include network interfaces 481 and controller 495.

The channel guide engine 431 contains a plurality of modules that interact with the Internet based television program delivery server 407 and request a channel list containing JPEG or other still preview images and request to preview Internet protocol television programs (and provide specifications for these preview still and video images). These modules include preview image/video request module 443 and channel guide download module 435. In addition, the channel surfing engine 441 contains a plurality of modules to display a scrollable and selectable channel list, display still and preview video images that include scrollable TV list display module 445, preview channel still image display module 447 and preview TV video display module 449.

The authentication interface module 429 provides user facilities to register by providing all necessary information and once registered to login anytime that user likes. During registration for the first time, the user may provide all necessary information such as user ID, email ID, password, television scheme (that may be arranged on the basis of region, language, price or categories such as news, cartoons, movies, music etc.) and billing schemes.

Anytime after registering for the first time, when the user authenticates and logs in, the channel guide download module 435 downloads a channel list (that may be custom made for the user) along with JPEG still images and program list. Then, the scrollable TV list display module 445 displays the channel list in a selectable and scrollable format, along with an icon adjacent to each channel name. Upon 'mouse over' on any of the icons, the preview channel still image display module 447 displays a JPEG still image that corresponds to the channel along with information and video program guide related to the channel. Upon 'mouse click' on the icon, the preview TV video display module 449 displays preview Internet protocol television program having reduced per video frame data size in a popup or embedded window until full scale television programs becomes available. Once full scale television program becomes available, the recipient device is handed over from receipt of the preview Internet protocol television program to receipt of corresponding Internet protocol television program. The search engine 453 provides search facilities from the channel lists on the basis of a key string.

Figure 5:
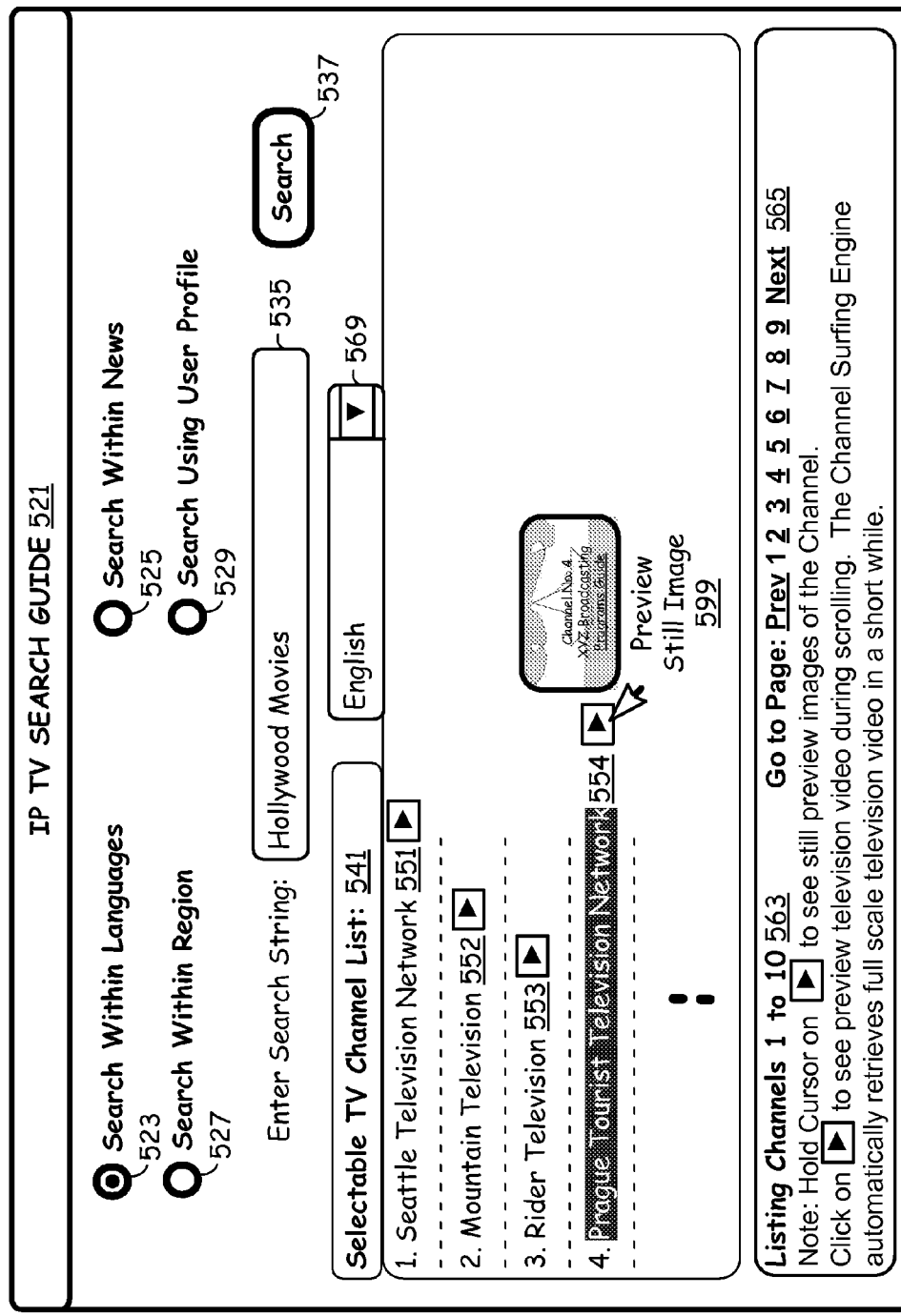
FIG. 5 is a schematic block diagram illustrating a snap shot of Internet television Interface (search guide), wherein a 'mouse over' selection of an Internet television channel through a scrollable list produces a JPEG preview still image related to the selected channel according to one or more embodiments of the present invention.

FIG. 5 is a schematic block diagram illustrating a snapshot of Internet television Interface (search guide), wherein a 'mouse over' selection of an Internet television channel through a scrollable list produces a JPEG preview still image related to the selected channel according to one or more embodiments of the present invention. The snapshot 505 depicts a user interface that is provided by the Internet based television program delivery server and displayed by the channel surfing engine. The user interface 595 may use user's existing browser software (upon which plug-ins such as channel guide engine, channel surfing engine and channel search engine are incorporated, for example). The user interface 595 typically provides many interfaces, such as for registering, logging in and displaying of channel TV search guides 521. These interfaces allow the user to scroll through channels, search, select, preview JPEG still images containing all information about the channel and also preview IPTV channels (either, during scrolling, or while waiting for a full scale IPTV program become available and handover of the recipient device to receipt of the respective television program source by the Internet based television program delivery server—described in the FIG. 6).

A selectable TV channel list 541 window lists first few (say, first 10 channels 563) of the IPTV channels, 551 through 554, which may also be sorted on any user chosen basis 569. The user interface 595 also allows the user to go to any page in the listing, or to a previous or next page 565. A helpful tip such as 'Note: Hold cursor on the icon adjacent to the IPTV channel to see still preview images of the channel, containing all information and program guide related to the channel. Click on icon adjacent to the IPTV channel to see preview television video during scrolling. The Channel Surfing Engine automatically retrieves full scale television video in a short while' may also be provided. A search facility provided by the user interface 595 allows the user to choose any of the radio buttons 523, 525, 527 or 529 (such as 'search within languages' 523, 'search within region' 527, 'search within news' 525 and 'search using user profile' 529) to simplify the IPTV channel searching process. Then, the user may search for a channel by entering a text in the text box 535 and clicking on a 'search' 537 button.

Finally, if the user performs 'mouse over' using cursor over the icon adjacent to the IPTV channel for a short while (say, 3 seconds), then the user interface 595 displays a preview JPEG still image 599 containing all information related to the corresponding IPTV channel, such as 'Channel No. 8, XYZ Broadcasting, Programming Guide'. Upon clicking on the 'Programming Guide' link, the user interface 595 displays in a popup window a most recent video programming guide related to the corresponding channel.

Figure 6:
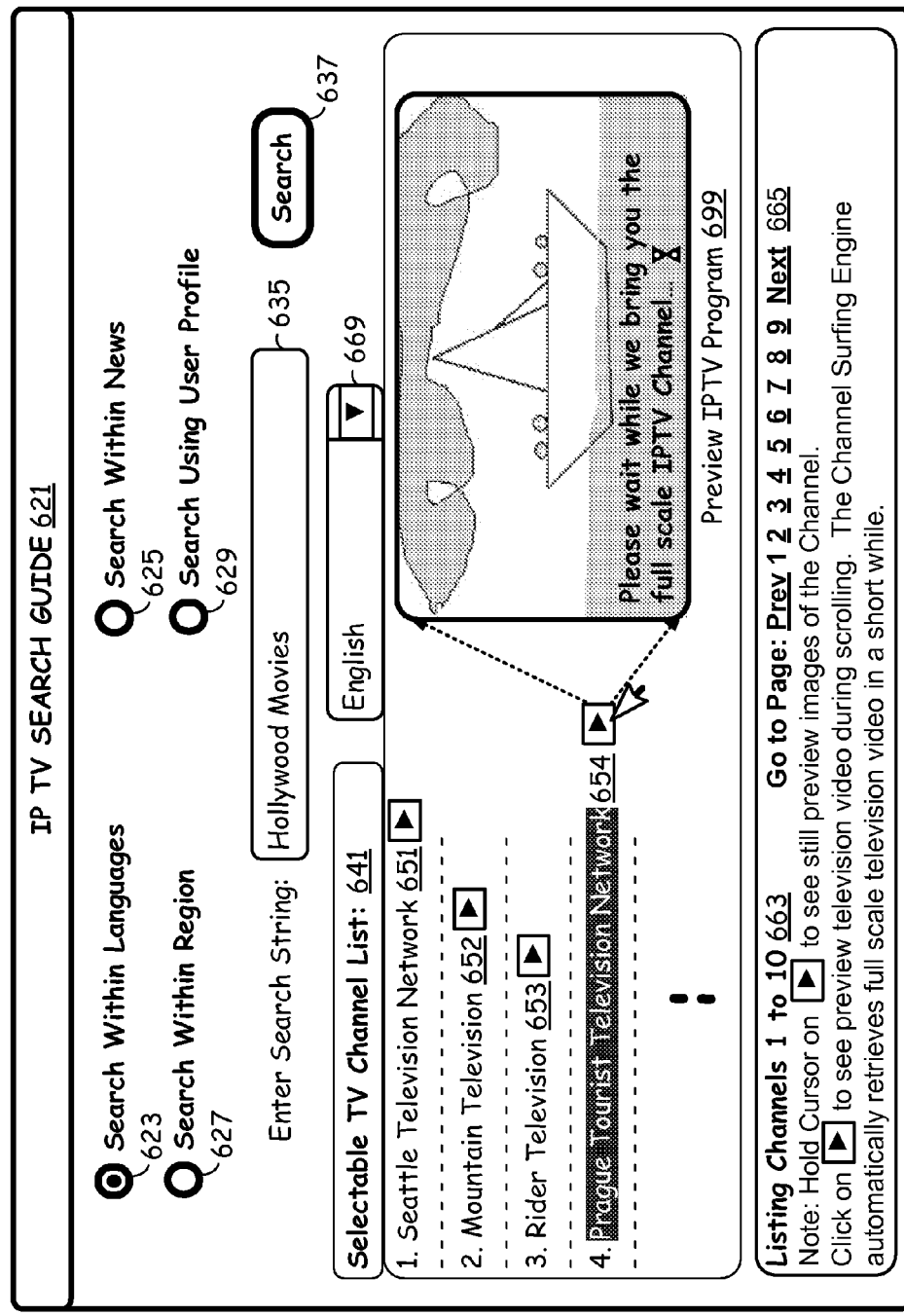
FIG. 6 is a schematic block diagram illustrating a snap shot of Internet television Interface (search guide), wherein the 'mouse click' selection of an Internet television channel through a scrollable list produces a preview Internet television program of the selected channel according to one or more embodiments of the present invention.

FIG. 6 is a schematic block diagram illustrating a snapshot of Internet television Interface (search guide), wherein the 'mouse click' selection of an Internet television channels through a scrollable list produces a preview Internet television program of the selected channel. The illustration 605 depicts a snapshot 621 of the user interface 695 containing a plurality of windows such as search window, selectable TV channel list 641 window and helpful tips window according to one or more embodiments of the present invention. These windows provide user ability to search and select a channel and preview IPTV program 699 until a corresponding full scale IPTV program becomes available.

The search window contains a plurality of radio buttons such as 'search within languages' 623, 'search within news' 625, 'search within region' 627 and 'search using user profile' 629. These radio buttons 623, 625, 627 and 629 narrow down the searching to some specific categories. Then, the user may input search keyword such as 'Hollywood movies' in a text box 635, click on a 'search' 637 button and the results are displayed in the selectable TV channel list 641 window. The helpful tip window may present some tips related to the operations within the user interface 695, such as 'Note: Hold cursor on the icon adjacent to the IPTV channel to see still preview images of the channel, containing all information and program guide related to the channel. Click on icon adjacent to the IPTV channel to see preview television video during scrolling. The Channel Surfing Engine automatically retrieves full scale television video in a short while. ' The helpful tips window may also be dynamic, displaying context sensitive tips.

The selectable TV channel list 641 window lists TV channels, ten channels 663 (that include channels 651, 652, 653, 654 etc.) at a time, for example, and the user interface 695 also provides facilities to go to previous page next page or any other page within the list. When the user performs 'mouse click' operation upon the icon adjacent to a TV channel, the user interface 695 opens a popup or embedded window, sends specifications of the window size and requests Internet based television program delivery server for a corresponding preview IPTV program and displays the live preview IPTV program 699 (along with a message such as 'Please wait while we bring you the full scale IPTV Channel . . . ').

This window 699 displays reduced bit rate per video frame (that is, reduced frame rate, color and pixel resolutions, aspect ratio and screen size, as per specifications provided by the user interface 695). If user chooses to move to another channel in the meanwhile by clicking elsewhere in the selectable TV channel list 641 window, where there are no links, texts or preview images, then the popup windows closes and preview IPTV program 699 stops. On the contrary, if the user chooses to continue to watch the IPTV program, then the user interface 695 waits for availability of corresponding full scale IPTV program, and redirects to the corresponding TV source device (handover is coordinated by the Internet based television program delivery server), receives and displays the full scale IPTV program on a full screen (or screen size chosen by the user).

Figure 7:
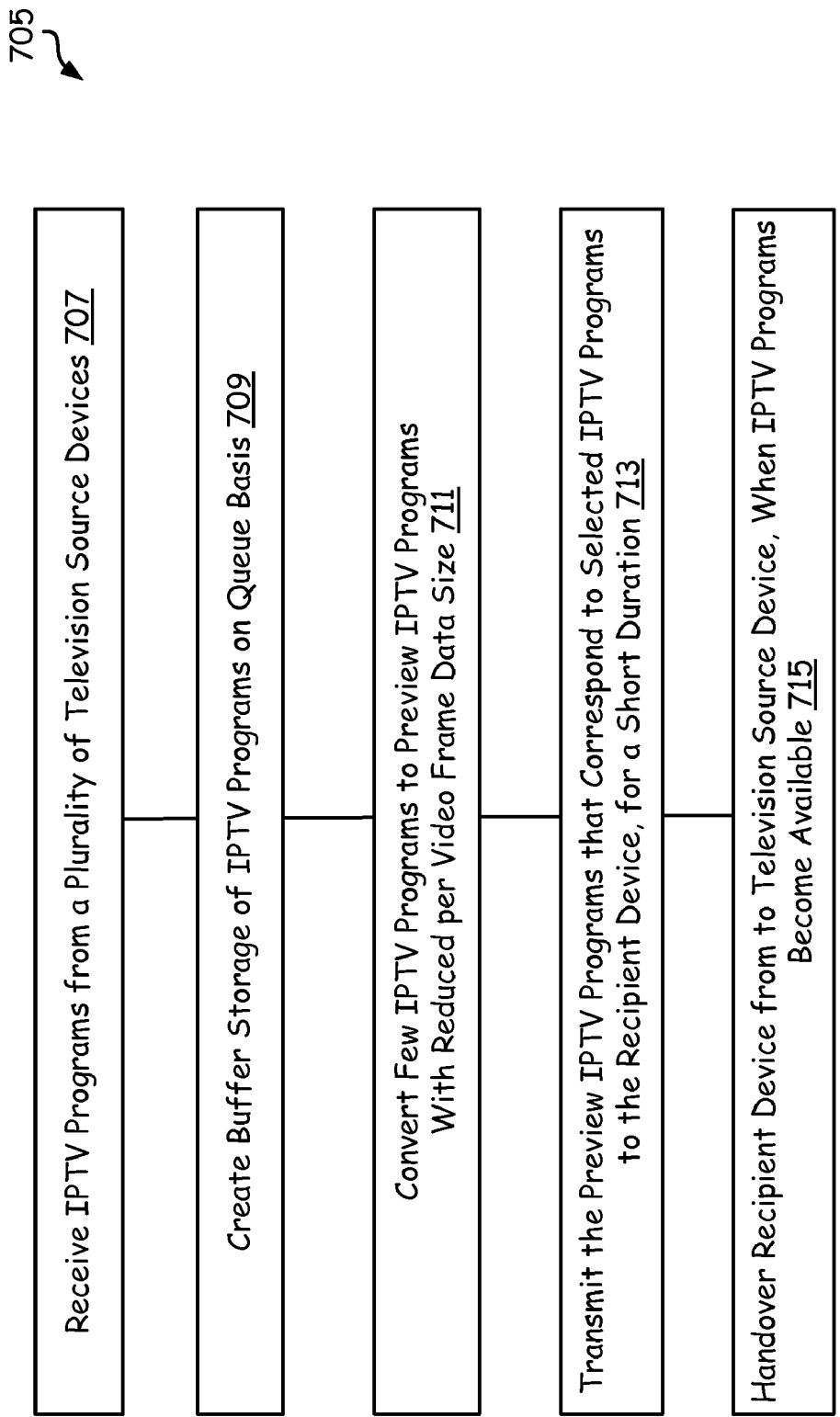
FIG. 7 is a flow diagram illustrating functionalities of the Internet based television program delivery server of FIG. 1 according to one or more embodiments of the present invention.

FIG. 7 is a flow diagram illustrating functionalities of the Internet based television program delivery server of FIG. 1 according to one or more embodiments of the present invention. The functionality begins at a block 707, when the Internet based television program delivery server receives a plurality of Internet protocol television program from a plurality of television source devices. These source devices typically are major television broadcast services located all over the world, who broadcast their services via a plurality of channels including open air, fiber optic cable, satellite and Internet, and minor television broadcast services who just utilize the Internet medium to broadcast their services. The television video content may be live or rebroadcasted from the archives. When these television source devices use Internet as broadcasting medium, they typically compress and packetize the television video content, using Internet protocol.

At a next block 709, the Internet based television program delivery server stores these plurality of IPTV program packets in a storage buffer (to be able to generate preview Internet protocol television program). At a next block 711, the Internet based television program delivery server converts few Internet protocol television programs to preview Internet protocol television programs having reduced per video frame data size. The reduction in per video frame data rate involves reductions in frame rate, color and pixel resolutions, screen size and aspect ratio.

At a next block 713, the Internet based television program delivery server transmits the preview Internet protocol television program, to recipient device, that correspond to a selected IPTV program at the recipient device. The transmission of preview Internet protocol television program will continue until the recipient device sends request to stop the preview Internet protocol television program, and if necessary handover the recipient device from the receipt of Internet based television program delivery server to a corresponding television source device.

At a next block 715, the Internet based television program delivery server hands over the recipient device from the receipt of the Internet based television program delivery server to a corresponding television source device, when full scale Internet protocol television program becomes available. If on the contrary, the recipient device requests to deliver preview Internet protocol television program of another channel during scrolling through channel lists, then the Internet based television program delivery server generates and delivers a corresponding preview Internet protocol television program.

Figure 8:
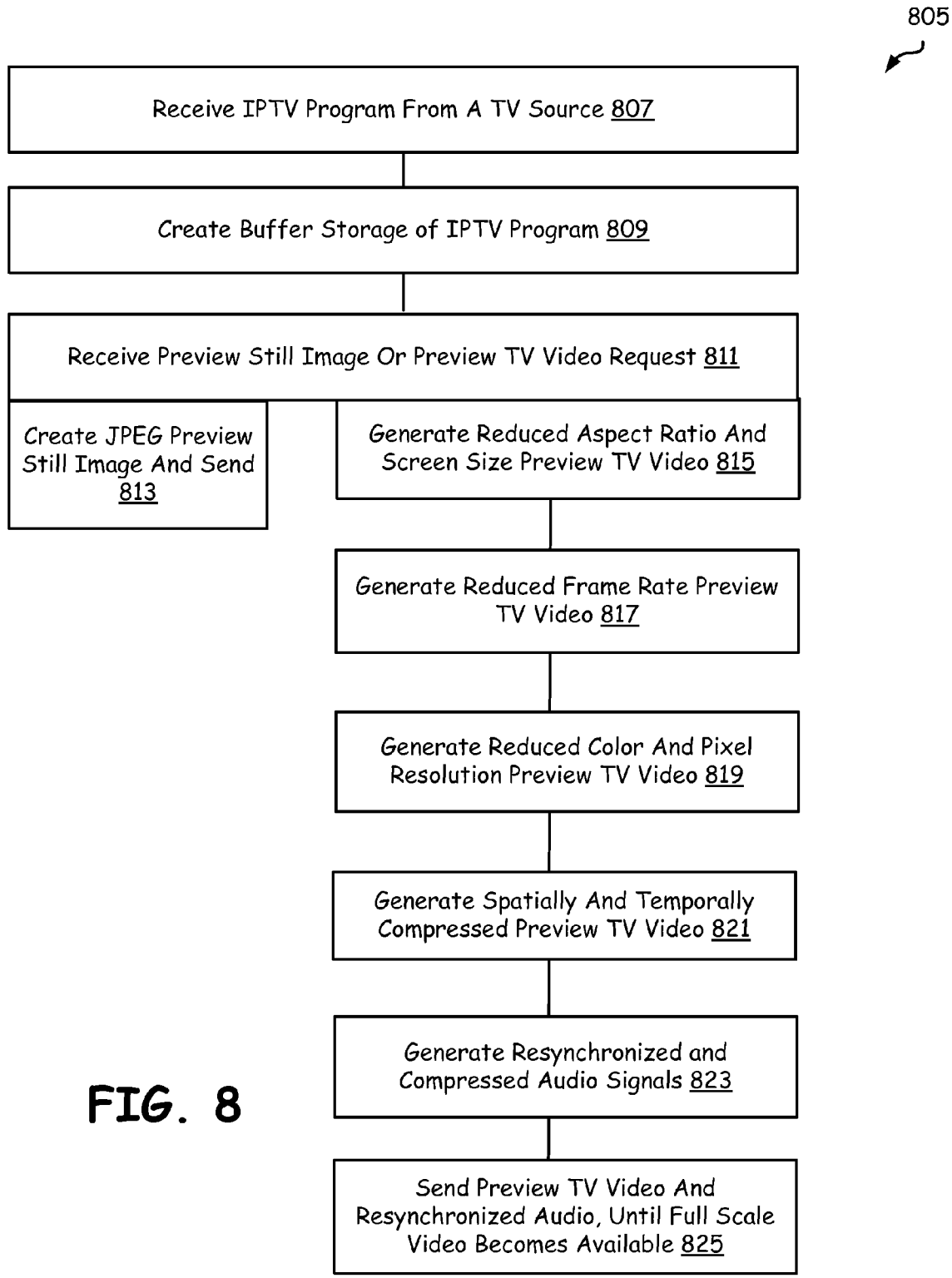
FIG. 8 is a flow diagram illustrating functionalities of the Internet based television program delivery server of FIG. 1, in detail, wherein the Internet based television program delivery server delivers preview JPEG still images and preview Internet protocol television program, having reduced per video frame data size according to one or more embodiments of the present invention.

FIG. 8 is a flow diagram illustrating functionalities of the Internet based television program delivery server of FIG. 1, in detail, wherein the Internet based television program delivery server delivers preview JPEG still images and preview Internet protocol television program, having reduced per video frame data size according to one or more embodiments of the present invention. The functionality 805 begins at a block 807, when the Internet based television program delivery server receives a plurality of television programs from a plurality of television program sources.

At a next block 809, the Internet based television program delivery server stores some of these packets in buffer, in queue fashion (that is, in first in first out manner). The reason for this is that, for the Internet based television program delivery server to generate preview Internet protocol television program, it needs multitudes of sequential video frames simultaneously. At a next block 811, the Internet based television program delivery server receives either preview JPEG still image request or preview Internet protocol television program request that corresponds to a selected channel at the recipient device. If the request is for the preview JPEG still image, then the Internet based television program delivery server generates such a JPEG still image containing information about the selected channel along with a video program guide that corresponds to programs of the selected channel at present time or in near future. If video program guide that corresponds to any other time is requested, then the Internet based television program delivery server generates such a video program guide and delivers it along with preview JPEG still image at block 813.

If, on the contrary, the request is for the preview Internet protocol television program, then the Internet based television program delivery server begins the process of generating it, by utilizing the buffered IPTV program packets that corresponds to the selected channel at the recipient device. These processes of generating the preview Internet protocol television program involve generating TV video frames of the selected Internet protocol television program by de-packetization and decompression, then the processes continue through blocks 815, 817, 819, 821 and 823. At the next block 815, the Internet based television program delivery server generates reduced screen size and aspect ratio preview TV video. At the next block 817, the Internet based television program delivery server generates reduced frame rate preview TV video. The frames are reduced upon the basis of screen size and aspect ratio, so that picture quality is tolerable.

At the next block 819, the Internet based television program delivery server generates reduced color and pixel resolutions, again, upon the basis of aspect ratio and screen size, so that picture quality is acceptable, within the reduced screen size and aspect ratio. At the next block 821, the Internet based television program delivery server generates spatially and temporally compressed TV video program. At the next block 823, the Internet based television program delivery server generates re-synchronized and compressed audio signals. The re-synchronization involves eliminating audio content that corresponds to the dropped frames and tone adapting the audio content, wherever video frames are drooped. At a final block 825, the Internet based television program delivery server sends preview Internet protocol television program to the recipient device, until full scale Internet protocol television program becomes available or the recipient device requests to stop the preview Internet protocol television program.

Figure 9:
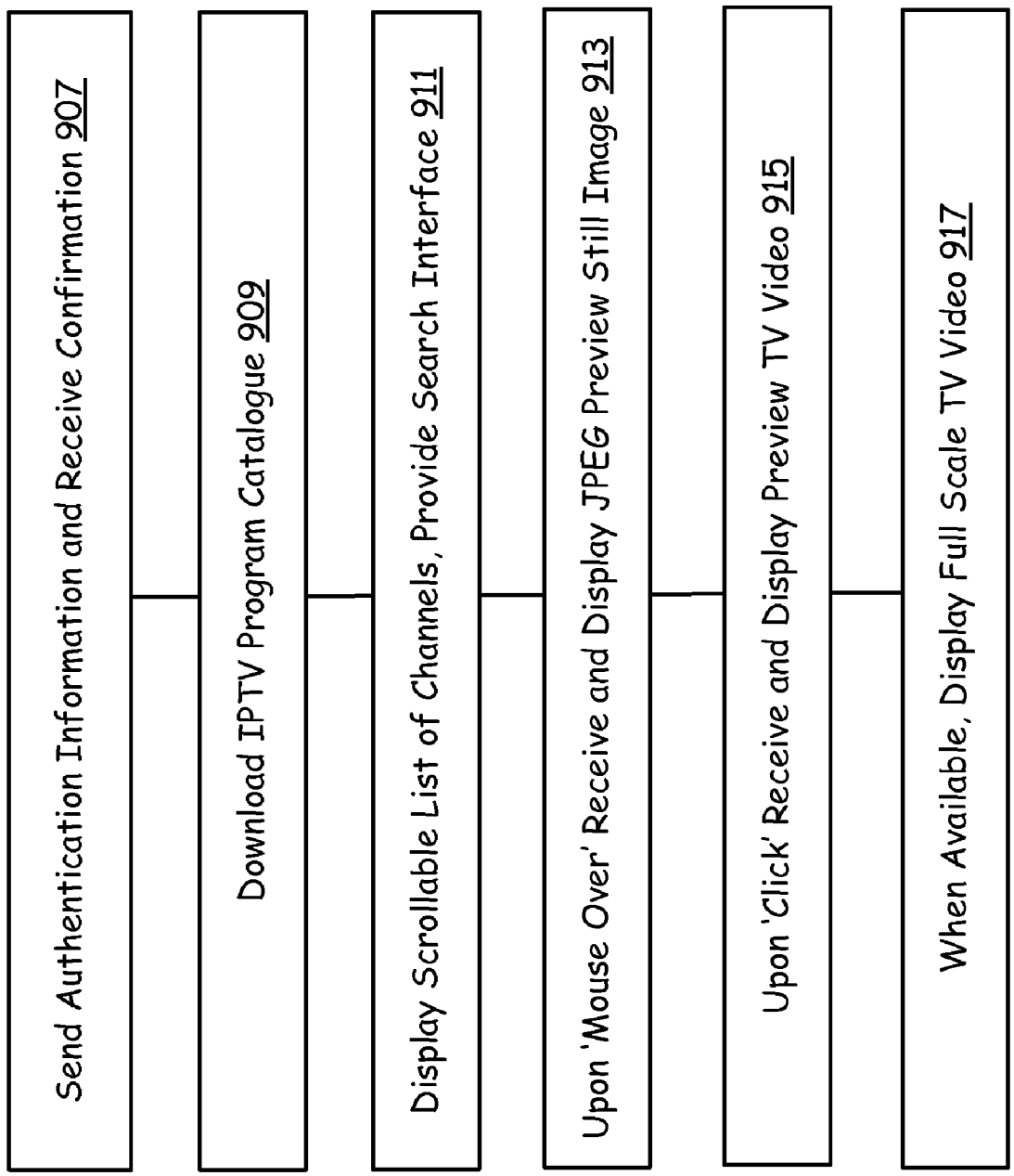
FIG. 9 is a flow diagram illustrating functionalities of the channel guide engine and channel surfing engine of FIG. 4 according to one or more embodiments of the present invention.

FIG. 9 is a flow diagram illustrating functionalities of the channel guide engine and channel surfing engine of FIG. 4 according to one or more embodiments of the present invention. The functionality 905 begins at a block 907, when the channel guide and channel surfing engines send authentication information of user, during login, and receive confirmation from the Internet based television program delivery server. Then, at a next block 909, the channel guide and channel surfing engines download IPTV program catalogue containing information along with preview JPEG still images about each of the channels (for example, corresponding to one display page in user interface at the recipient device).

At a next block 911, the channel guide and channel surfing engines generate and display a scrollable list from the downloaded IPTV program catalogue and provide a search interface to search for channels on any prefixed bases such as language, region, country and categories (for example, news, sports, cartons, children's programs etc.). At a next block 913, the channel guide and channel surfing engines display JPEG preview still image of a selected channel (for example, upon 'mouse over' on an icon adjacent to the selected channel in the scrollable list) along with all information related to the channel. In addition, the channel guide and channel surfing engines may also provide detailed video program guide, if user clicks on a corresponding link in the displayed JPEG preview still image.

At a next block 915, the channel guide and channel surfing engines receive and display preview Internet protocol television program of a selected channel (for example, upon 'mouse click' on an icon adjacent to the selected channel in the scrollable list). These reduced screen size and aspect ratio preview Internet protocol television program specifications may be a default setting, or may be generated and sent by the channel guide and channel surfing engines dynamically depending upon the Internet channel bandwidth considerations. In addition, the preview Internet protocol television program may be displayed in a popup window or embedded into the user interface provided by the channel guide and channel surfing engines. At a final block 917, the channel guide and channel surfing engines redirect the address to a corresponding television source device, the handover being coordinated by the Internet based television program delivery server (once full scale Internet protocol television program becomes available). When full scale Internet protocol television program becomes available, the channel guide and channel surfing engines may utilize services of any of the media player available in the recipient device or may provide one themselves, thus allowing user to be able to view highest possible quality Internet protocol television program.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. For example, functional modules illustrated may be software and/or hardware modules that perform the indicated functionality but are not limited to hardware only or software only. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. An Internet based television program delivery server, communicatively coupled to a plurality of television source devices and a plurality of recipient devices, the Internet based television program delivery server comprising:
   at least one network interface that receives television video content from at least one of the plurality of television source devices;
   a memory that stores the television video content;
   a video conversion circuitry that converts at least some of the television video content to preview television video content, the preview television video content having reduced per video frame data size and frame rate as compared to the television video content, wherein the reduced per video frame data size of the preview television video content having reduced pixel resolution, reduced aspect ratio, reduced color resolution, and reduced screen size than the received television content;
   an audio synchronization circuitry to synchronize audio of the received television video content to audio for the preview television video content to compensate for dropped frames;
   an audio encoding module; and
   a video encoding module, wherein the audio and video encoding modules encode and packetize the preview television video content for transmission;
   the at least one network interface receiving a channel preview request from a recipient device; and
   the at least one network interface transmitting corresponding preview television video content to the recipient device in response to the channel preview request.

2. The Internet based television program delivery server of claim 1:
   further comprising:
      authentication modules;
      buffer storage units;
      queuing modules;
   wherein the video conversion circuitry comprises at least one video frame adaptation module that adapts a plurality of television programs to compensate for delay in full scale television program delivery during, channel changing;
   wherein the queuing modules temporarily store Internet protocol television program packets arriving from each of the plurality of television source devices in various buffer storage units;
   wherein the authentication modules, via login interfaces, authenticates the first recipient device;
   wherein the video frame adaptation module adapts a television program requested by the recipient device to compensate for the delay in television program delivery, to produce lower bandwidth Internet protocol television program packets, during channel changing; and
   the Internet based television program delivery server delivers the lower bandwidth Internet protocol television program packets to the recipient device, during initial periods of channel changing at the recipient device, until full scale television program becomes available.

3. The Internet based television program delivery server of claim 1:

further comprising video guide generation circuitry operable to produce a video guide based upon the television video content from the plurality of television source devices; and
wherein the at least one network interface transmitting the video guide to the recipient device.

4. The Internet based television program delivery server of claim 3, wherein the video guide comprises:
video content representative of television video content corresponding to at least some of the plurality of television source devices; and
respective program information for the video content.

5. The Internet based television program delivery server of claim 1, further comprising processing circuitry that coordinates handover of the recipient device from receipt of the preview television video content to receipt of corresponding television video content.

6. The Internet based television program delivery server of claim 1, wherein the plurality of television source devices produce Internet protocol television program packets having respective protocol standards.

7. The Internet based television program delivery server of claim 1, wherein the video conversion circuitry adapts the television video content of differing protocol standards to a format corresponding to the recipient device.

8. The Internet based television program delivery server of claim 1, wherein the at least one network interface transmitting both the preview television video content and the television video content to the recipient device.

9. The Internet based television program delivery server of claim 1, wherein the at least one network interface transmits both the preview television video content and the television video content to the recipient device in response to a corresponding channel selection request received from the recipient device.

10. A method performed by an Internet based television program delivery server that supports delivery of television programs to a recipient device, the method comprising:
receiving a plurality of Internet protocol television programs;
buffering the Internet protocol television programs;
converting at least some of the Internet protocol television programs to preview Internet protocol television programs, the preview Internet protocol television programs having reduced per video frame data size and frame rate as compared to the received Internet protocol television programs, wherein the reduced per video frame data size of the preview Internet protocol television programs having reduced pixel resolution, reduced aspect ratio, reduced color resolution, and reduced screen size than the received Internet protocol television programs;
synchronizing audio of the received Internet protocol television programs to audio for the preview Internet protocol television programs to compensate for dropped frames;
encoding and packetizing the preview Internet protocol television programs for transmission; and
transmitting the preview Internet protocol television programs that correspond to selected received Internet protocol television programs to the recipient device, for a short duration, until respective received Internet protocol television programs become available for viewing on the recipient device.

11. The method of claim 10, further comprising transmitting the Internet protocol television programs to the recipient device while also transmitting the preview Internet protocol television programs.

* * * * *